Jan. 15, 1963 J. FAISANDIER 3,073,331
UNLOADING VALVE FOR A HYDRAULIC PRESSURE CIRCUIT
Filed March 7, 1960
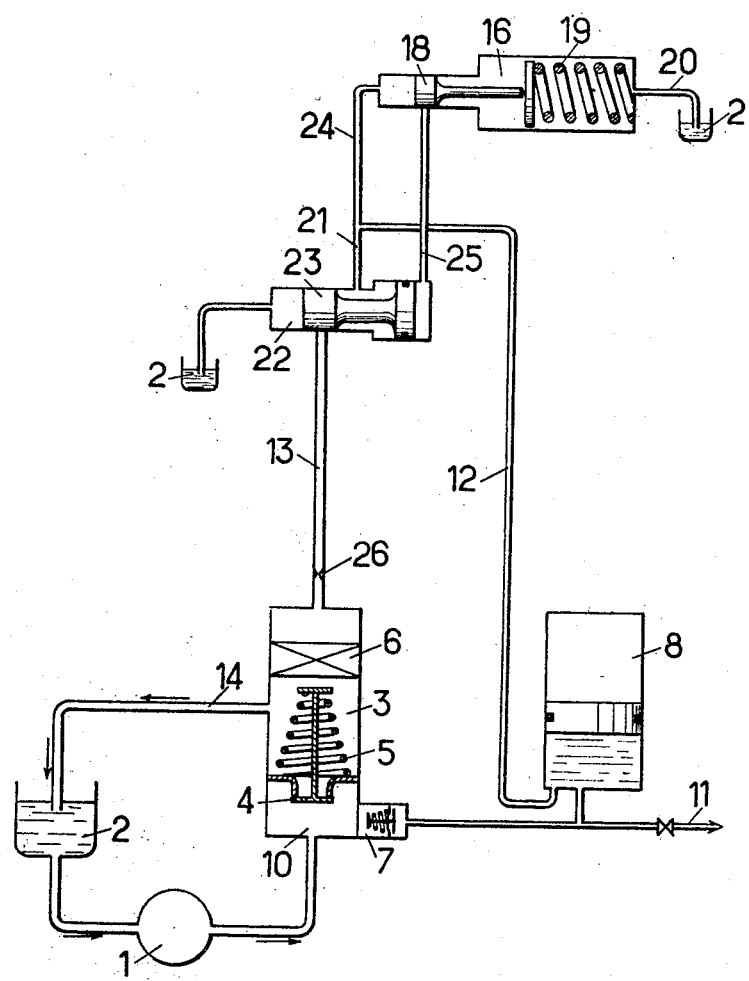

United States Patent Office 3,073,331
Patented Jan. 15, 1963

3,073,331
UNLOADING VALVE FOR A HYDRAULIC
PRESSURE CIRCUIT
Jacques Faisandier, 32 Boulevard Felix Faure,
Chatillon-sous-Bagneux, France
Filed Mar. 7, 1960, Ser. No. 13,039
Claims priority, application France Mar. 17, 1959
4 Claims. (Cl. 137—108)

The present invention relates to hydraulic circuits, and more particularly to circuits comprising a pump or several pumps arranged in parallel, which pump supplies a regulating device, which has the task of connecting the delivery side of the pump directly to the tank without back-pressure or counter-pressure, if the pressure in the working circuit exceeds a certain value and, vice versa, of directing the delivery of the pump towards the working circuit, which contains usually a hydraulic accumulator, when the pressure of the circuit drops below another value.

Directly controlled regulators, that is, regulators in which the movement of the mobile element is controlled directly by the pressure of the working circuit, can, owing to the hydraulic shocks caused by them, be used only in equipment of low power, the mechanical components of which are overdimensioned.

Indirectly controlled regulators, that is regulators with pilot distributors inserted into the control circuit by counter-pressure, avoid this disadvantage; however, there arises in this case another disadvantage, which these regulators share with the directly controlled regulators, namely the risk of functioning as safety valve, which runs counter to the desired result.

I realized that this risk was connected in part—and very generally—with the very principle of regulators, whereby their output is a function of the displacement velocity of their closure and therefore of the pressure variation $$\frac{dP}{dt}$$

and in part with wear, this wear tends to increase the stroke of the closing member and thereby the instantaneous oil loss occurring during this stroke.

I found that the operation of regulators could be generally much improved by using an arrangement which applies the second derivative $$\frac{d^3P}{dt^3}$$

of the pressure variation $$\frac{dP}{dt}$$

and hence to produce, owing to the introduction of new factors, the possibility of obtaining an unstable operation. In particular, I found that the function of regulators with indirect control could be improved by replacing closing elements co-operating with a seat, such as the ball valves which have been used hitherto, by slide valves. With slide valves, there is no risk of jamming or sticking, and the disadvantage of their larger inertia, which was hitherto an obstacle in their use, can be eliminated exactly by the conditions of instability, which form the main object of the present invention.

With this main object in view, the conventional pressure regulators, which have the form of a shut-off valve, arranged in the return circuit from the pump to the tank, and the opening of which is to be controlled by the counter-pressure in the working circuit, is associated on the one hand, with a pilot distributor, the movement of the mobile component of which would be governed by the counter-pressure, and on the other hand, and according to the present invention, with a second control distributor, located in the connection between the first distributor and the regulator, the movement of the distributing organ of said control distributor being controlled by the first distributor.

The invention will be described in the following, by way of example, with reference to the accompanying drawing, without, however, limiting the principle of the invention to the embodiment shown.

The accompanying drawing represents the diagram of an arrangement of the invention.

In said diagram, reference numeral 1 signifies the pump, 2 the tanks and 3 the pressure regulator assembly. This latter comprises the stop valve 4, which is actuated by the spring 5, while its stem is controlled by the action of the piston 6. Reference numeral 7 is a non-return valve of conventional design, and 8 a hydraulic accumulator.

The functioning would be as follows:

The pump supplies the regulator 3 at 10. Normally, the valve 4 is closed and the pump delivers through the valve 7 into the working circuit 11, to which is connected the accumulator 8. If the working circuit is under normal pressure, this pressure reacts, through the pipes 12, 13, supposed to be directly interconnected on the piston 6, which actuates the stem of the valve 4, causing this valve to open. The pump now delivers through the pipe 14 into the tank, the valve 7 closes and acts as non-return valve.

If the pressure in the circuit 11 drops, the piston 6 is no longer capable of holding the spring 5 in the compressed condition, the valve 4 closes, and the pump 1 delivers again into the circuit 11.

In the case of indirectly controlled regulators of known types the device would include the valve distributor 16, the movement of the valve of which being controlled by the prevailing pressure in pipe 12, and connecting pipe 13 either with the tank or with pipe 12.

According to the invention the pipe 12 is connected to the pipe 13 by the pipe 21 and the second valve distributor 22. In this latter, the differential slide valve 23 connects the pipe 13 either with the tank 2 or with the pipe 21. The first distributor remains affected by the pressure in the working circuit through the pipes 12 and 24. Its slide 18 connects the pipe 25 with the rear face of the slide valve 23 to either the tank 2 or the pipe 24, in that the movements of the slide 18 control the movements of the slide 23.

When the pressure in the working circuit 11 is weak, the slide 18 is displaced towards the left, the slide 23 is on the right-hand side, the rear face is connected to the tank, the pipe 13 is connected to the tank, and the valve 4 is closed. If the pressure rises sufficiently in the working circuit, the slide 18 returns to the right-hand side, placing the pipe 25 under pressure; the slide valve 23 returns to the left, placing the pipe 13 under pressure. The valve 4 opens, and the pump delivers into the tank.

An analysis of the assembly consisting of the conventional directly or indirectly controlled regulator, considered as a servo mechanism, shows that the valve 4 can stop before complete closure and operate therefore in a stable manner as a safety valve, which is far from the desired purpose.

In comparison, the analysis of the arrangement according the invention shows that there results the following equation $$a\frac{d^3P}{dt^3}+P=P_1$$

in which P is the actual pressure, $P_1$ the pressure which counteracts the tension of the spring 19 when acting on the section of the slide 18, and $a$ is a constant.

The general solution of this equation is $P=p1$, increased by the general solution of the equation without second member, which represents a special case of the more general equation:

$$a\frac{d^3P}{dt^3}+b\frac{d^2P}{dt^2}+c\frac{dP}{dt}+P=0$$

which can be written, if $p$ is Laplace's operator:

$$ap^3+bp^2+cp+1=0$$

It is known that the solution of this equation is unstable if $$\frac{bc}{a}<1$$

this is the case if $b=c=0$.

In fact, a more precise analysis shows that $b$ and $c$ are not really equal to zero, but it is always possible to determine $a$, which is a constant of the system, in such a way that $$\frac{bc}{a}$$

is effectively less than 1. In this way the instability and the full opening of the valve 4 are assured, and the required purpose is fulfilled.

Detailed Analysis

The delivery of distributor 16 is $$q_1=k(P-P_1)$$

$P$ being the prevailing pressure in the accumulator 8
$1/k$ being the flexibility of spring 19
$P_1$ being the pressure $\frac{F_0}{s_1}$
$F_0$ being the tension of spring 19
$s_1$ being the area of the cross section of valve 18.

The delivery in pipe 25 being proportional to the displacement $x$ of 18, we have $$F=F_0+Kx$$

and $$Ps=F=F_0+kn$$

consequently $$(P-P_1)s=kx$$

$$x=\frac{s}{k}(P-p)$$

hence the delivery in 25 is $$q_1=k(P-P_1)$$

the delivery $q_2$ of distributor 22 in pipe 13 is $$q_2=k_1y$$

$y$ being the displacement of valve 23 and $K_1$ being the cross section of the left surface of valve 23 but $$q_1=K_2\frac{dy}{dt}$$

$K_2$ being the cross section of the right surface of valve 23.
If $s$ is the cross section of the aperture of stop valve 4, $Z$ being the displacement of said valve $$q_2=K_3\frac{dz}{dt}$$

$K_3$ being the cross section of piston 6.
Of the foregoing equation it results finally (1) $$\frac{d^2s}{dt^2}=K_4(P-P_1)$$

$K_4$ being a constant.
On the other hand, the laws of variation of pressure $P$ in the circuit may be established:

$$Q_1=Q_2+Q_3+Q_4$$

with
$Q_1$=delivery of pump 1
$Q_2$=delivery of pipe 11
$Q_3=s.V$
$V$ being the speed of the liquid passing through the valve 4

$$Q_4=K_5\frac{dP/K_5}{dt}$$

being a constant of the accumulator $$K_5\cong\frac{\text{volume}}{\text{Pressure}}$$

if $$Q_0=Q_1-Q_2$$

we get $$Q_0=K_5\frac{dP}{dt}+Vs$$

the first derivation gives $$\frac{K_5}{V}\frac{d^2P}{dt^2}+\frac{ds}{dt}=0$$

and the second derivation $$\frac{K_5}{V}\frac{d^3P}{dt^3}+\frac{d^2s}{dt^2}=0$$

We can now transpose Equation 1:

$$\frac{K_5}{VK_4}\frac{d^3P}{dt^3}+K_4P=K_4P$$

$$\frac{K_5}{VK_4}\frac{d^3P}{dt^3}+P=p_1$$

The solution of said equation is $$P=p+Z$$

$Z$ being the general solution of the equation (2) $$\frac{K_5}{V_{k4}}\frac{d^3p}{dt^3}+P=0$$

This last equation is a particular case of the more general equation $$a\frac{d^3P}{dt^3}+b\frac{d^2P}{dt^2}+c\frac{dP}{dt}+P=0$$

$a$, $b$, $c$ being constants.
If $p$ is the operator of Laplace we can write the last equation $$ap^3+bp^2+cp+1=0$$

It is already known that the solution of such an equation is unstable if $$\frac{bc}{a}<1$$

which is the present case as in (2)

$$b=c=0$$

As a matter of fact, a more detailed analysis would show that $b$ and $c$ are not quite zero but it is already possible to choose $$a=\frac{K_5}{VK_4}$$

such that in any case $$\frac{bc}{a}<1$$

It is possible to place in the delivery duct above the regulator 3, and on the pipe 13, a diaphragm 26 in order to absorb all ramming shocks, without incurring the risk of causing the safety valve to operate.

In the drawing, the pilot distributor 16 is shown with a valve having only one diameter. This solution yields the narrowest operating range. If this range is to be extended, known distributors with dual section slide valves may be used.

What I claim is:

1. A hydraulic circuit comprising a pressure source, a high pressure pipe, a low pressure pipe, a pipe by-passing said pressure source and a pressure regulator including a stop valve mounted in said by-passing pipe mounted to open against the flow in said by-pass pipe, a pressure controlled actuating member, and an inlet and an inlet pipe connected to said high pressure pipe and to said actuating member to admit pressure fluid to said actuating member, a valved distributor system including a differential pressure controlled first valve means mounted in said inlet pipe, said valve adapted in a first position biased by the pressure in said high pressure pipe to connect said high pressure pipe and said inlet and in a second position biased by the pressure in said high pressure pipe to connect said inlet and said low pressure pipe, a second valve hydraulically controlled by the pressure prevailing in said high pressure pipe and said second valve being hydraulically operatively connected with the said first valve distributor to control the valve element of said first valve.

2. In a hydraulic fluid circuit comprising a pressure source and a pressure circuit in series, a by-pass circuit providing pressure regulation for said pressure circuit, said by-pass circuit including a stop valve biased toward its closed condition, said stop valve normally preventing flow of hydraulic fluid into said by-pass circuit, and adapted to be opened against the pressure in said pressure circuit, pressure actuated means operatively mounted with respect to said stop valve to open said stop valve, a first pressure connection between said pressure circuit and said pressure actuated means, a pressure operated differential first valve means in said pressure connection between said pressure circuit and said pressure operated means normally biased by pressure in said pressure circuit toward closed position, a second pressure connection including a second valve connecting the pressure circuit to said pressure operated differential first valve adapted to provide pressure to open said differential first valve, said second valve being so constructed and arranged as to open under an increase of pressure in said pressure circuit whereby hydraulic fluid under pressure is provided to said pressure operated differential first valve to open said first valve whereby said pressure actuated means operates to open said stop valve.

3. In the hydraulic circuit as set forth in claim 2, said stop valve and said second valve being spring-biased, the three said valves being proportioned each relatively to the others to secure the balance of movements therebetween to assure operation of said stop valve.

4. In the hydraulic circuit as set forth in claim 2, said second valve being spring-biased, said pressure operated differential first valve being of a type including a member which may be subject to pressure on each side and operated to the open position by equalization of pressure on both sides of said member, and the three said valves being each proportioned relatively to the others to secure the instability of the functioning of the said stop valve.

References Cited in the file of this patent

UNITED STATES PATENTS

| | | |
|---|---|---|
| 135,976 | Eames | Feb. 18, 1873 |
| 1,190,799 | Rene | July 11, 1916 |
| 2,579,051 | Rose | Dec. 18, 1951 |
| 2,584,638 | Staude | Feb. 5, 1952 |
| 2,614,580 | Cormier | Oct. 21, 1952 |

FOREIGN PATENTS

| | | |
|---|---|---|
| 119,382 | Australia | May 15, 1930 |
| 141,746 | Australia | May 10, 1935 |
| 506,090 | Germany | Aug. 30, 1930 |